(12) United States Patent
Keller et al.

(10) Patent No.: US 7,137,477 B2
(45) Date of Patent: Nov. 21, 2006

(54) SOUND ABSORBERS

(75) Inventors: Hans-Peter Keller, Suhr (CH); Marco Schneider, Dortmund (DE); Olaf Dohring, Dortmund (DE); Rod Morris-Kirby, Warwickshire (GB); Norbert Nicolai, Schermbeck (DE); Colm Doris, Waterford (IE)

(73) Assignee: Clion Ireland Holding Ltd., Waterford (IE)

( * ) Notice: Subject to any disclaimer, the term of this patent is extended or adjusted under 35 U.S.C. 154(b) by 416 days.

(21) Appl. No.: 10/747,763

(22) Filed: Dec. 29, 2003

(65) Prior Publication Data

US 2004/0238275 A1 Dec. 2, 2004

(30) Foreign Application Priority Data

May 28, 2003 (DE) .................. 103 24 257

(51) Int. Cl.
*E04B 1/82* (2006.01)
*E04B 2/02* (2006.01)
*G10K 11/16* (2006.01)

(52) U.S. Cl. ............... 181/286; 181/290; 181/296; 296/39.3

(58) Field of Classification Search .......... 181/286, 181/290, 296; 296/39.3
See application file for complete search history.

(56) References Cited

U.S. PATENT DOCUMENTS

| | | | | |
|---|---|---|---|---|
| 3,239,973 A | * | 3/1966 | Hahn et al. ............... 52/144 |
| 3,783,969 A | * | 1/1974 | Pall ........................ 181/286 |
| 4,131,664 A | * | 12/1978 | Flowers et al. ........... 264/510 |
| 4,283,457 A | * | 8/1981 | Kolsky et al. ............ 442/30 |
| 4,379,192 A | * | 4/1983 | Wahlquist et al. ........ 428/156 |
| 5,245,141 A | * | 9/1993 | Fortez et al. ............. 181/288 |
| 5,841,081 A | * | 11/1998 | Thompson et al. ....... 181/286 |
| 6,145,617 A | * | 11/2000 | Alts ........................ 181/290 |
| 6,156,842 A | * | 12/2000 | Hoenig et al. ............ 525/171 |
| 6,220,388 B1 | * | 4/2001 | Sanborn ................... 181/290 |
| 6,376,396 B1 | * | 4/2002 | Thorn et al. ............. 442/136 |
| 6,713,150 B1 | * | 3/2004 | Alts et al. ................ 428/73 |
| 6,720,068 B1 | * | 4/2004 | Vanbemmel et al. .... 428/317.9 |
| 2003/0066708 A1 | * | 4/2003 | Allison et al. ........... 181/290 |

FOREIGN PATENT DOCUMENTS

| | | |
|---|---|---|
| DE | 3601204 | 7/1987 |
| DE | 3818301 | 12/1989 |
| DE | 4114140 | 11/1992 |
| DE | 4211409 | 10/1993 |
| DE | 4305428 | 7/1994 |
| DE | 4422585 | 10/1995 |

(Continued)

*Primary Examiner*—Edgardo San Martin
(74) *Attorney, Agent, or Firm*—Harness, Dickey & Pierce, PLC

(57) ABSTRACT

The present invention relates to a sound absorber consisting of a first non-woven fabric facing towards the sound-emitting source having a layer thickness within a range of from 2 to 15 mm, a density within a range of from 50 to 500 kg/m$^3$, a weight per surface area within a range of from 0.1 to 2.5 kg/m$^2$, and a flow resistance within a range of from 50 to 1000 kNs/m$^4$, and a second non-woven fabric facing away from the sound-emitting source has a layer thickness within a range of from 10 to 28 mm, a density within a range of from 20 to 100 kg/m$^3$, a weight per surface area within a range of from 0.4 to 1 kg/m$^2$, and a flow resistance within a range of from 10 to 40 kNs/m$^4$.

18 Claims, 1 Drawing Sheet

FOREIGN PATENT DOCUMENTS

| | | |
|---|---|---|
| DE | 4444030 | 10/1995 |
| DE | 4428613 | 2/1996 |
| DE | 19812925 | 9/1999 |
| DE | 19821532 | 11/1999 |

* cited by examiner

SOUND ABSORBERS

FIELD

The present invention relates to sound absorbers consisting of two interconnected non-woven fabrics bonded through thermoplastic and/or thermoset materials.

BACKGROUND

In the engine compartment of modern vehicles, in both passenger and utility fields, sound-absorbing parts in the form of absorbers are increasingly employed for reducing engine noise. These absorbers, which are predominantly designed as formed parts, have an influence on the exterior and interior noise of the vehicles. The formed parts predominantly employed today which are made of non-woven fabrics (e.g., of cotton) or of PU foam typically have deflection temperatures under load of up to about 160° C. For higher thermal loads, these formed parts are partially or completely backed with aluminum foils as heat reflectors on the surface facing the heat source in order to protect the non-woven fabrics lying behind.

From DE 36 01 204 A, an absorptive formed part consisting of several layers of non-woven is known which may serve for noise-damping linings for the engine compartment of motor vehicles. The absorptive formed part consists of a cover layer of plastic fibers on the engine side, a contiguous heat-insulating and sound-absorbing layer of inorganic fibrous material having a high deflection temperature, and another absorbing layer of organic fibers.

DE 38 18 301 C also describes a noise-damping formed part for the engine compartment of motor vehicles in which an inorganic fibrous material bonded by a binder and having a high deflection temperature is covered, on the engine side, with a carbon fibrous material through a bonding agent containing a melamine resin. This formed part is said to have a good sound absorption and to be also suitable as a thermal insulation in a temperature range of up to about 500° C.

DE 42 11 409 A1 relates to a self-supporting, heat-insulating and sound-absorbing lining for combustion engines of motor vehicles which consists of several layers compression-molded under the action of pressure and heat to form zones having a predefined compression. On the engine side, the lining consists of a thicker heat-insulating and sound-absorbing layer of an inorganic fibrous material which is covered by a carbon fibrous material. A thicker layer of inorganic fibrous material facing away from the engine will cure into a self-supporting support layer. On the body side, this support layer may be covered with a layer of a polyester non-woven or polyacrylonitrile fibers.

A heat-insulating and sound-absorbing lining which is also often employed in the automobile field is based on melamine resin foams to which temperature-resistant cover layers are applied on one or both sides. According to DIN 4102, melamine resin foams are considered flame-resistant, and due to their behavior in fire, are to be classified into class B1. Due to its long-term thermal stability of −40° C. to 150° C. and its long-term temperature resistance of 200° C. for three weeks, this material is particularly suitable for preparing linings for the engine compartment of motor vehicles. However, this material is extraordinarily expensive so that it has been the object of the present invention to provide linings for the engine compartment of motor vehicles which are comparable therewith regarding the heat insulation and sound absorption, but involving a significant reduction in costs as compared to the prior art.

DE 198 21 532 A1 describes heat-insulating and sound-absorbing linings (sound absorbers) for the engine compartment of motor vehicles, consisting of a cover layer on the engine side, and in contact therewith an acoustically insulating thermoset foam layer having a long-term thermal stability of up to 180° C. and a long-term temperature resistance of 200° C. for three weeks, of a thickness of less than 5 mm, and in contact therewith an acoustically insulating layer of plastic foam, particle composite foam or non-woven fabric, consisting of native or synthetic fibers and mixtures thereof, needled or not, and in contact therewith a cover layer facing away from the engine side. Thus, the lining parts are particularly suitable for the lining of build-in components, body parts or the like of automobiles, heat-emitting machines and aggregates, especially of sound-absorbing elements for protection against too high thermal loads from machine guidance systems, catalyst parts or the like, especially in the engine compartment of motor vehicles.

In this case, the geometry of the lining part depends on the interior side of the front access door and the space conditions in the engine compartment. The lining parts are attached, for example, by engaging them into a hole pattern in the interior zone of the front access door. They are held by as few spreading rivets as possible. In the region of the bulkheads within the engine compartment, it is possible to apply lining parts between the body and the engine, the lining parts preferably being attached to the body using coarse thread bolts or snap fasteners (or sheet metal nuts). The lining parts serve for sound absorption of the engine noise.

In the region of the wheel housing in the engine compartment, the lining parts on the engine side are positioned in the air collection space. They prevent engine noise from intruding into the interior space and are preferably also attached with coarse thread bolts or snap fasteners. In the region of the bulkhead of the engine compartment, the lining parts serve, for example, for covering the body-in-white from the cross member bulkhead or disk gap to the level of the tunnel for completing the underside paneling. Optionally, the lining parts may contain openings for ducts of the air conditioning system. In the region of the tunnel exterior, the lining parts may also be inserted between the transmission or the exhaust gas train and the floor pan. In this case too, it is particularly preferred to attach them with coarse thread bolts and/or snap fasteners, for example, sheet metal nuts.

When the lining parts are employed in the region above the clean-air panel, it is covered from above and is then attached there. It is then positioned above the left and right bulkheads of the engine compartment.

There is no drop of strength below the initial value by the action of heat when used as directed.

DE 41 14 140 A1 relates to sheet fabrics in which the bonding of the fibers is effected through thermoplastic polyamides. The advantage of the sheet fabrics is their suitability for recycling after use. In addition, in the preparation of the sheet fabrics, disadvantages put up with to date, offensive smells and undesirable decomposition products are excluded.

DE 43 05 428 C1 describes a floor covering formed from a non-woven sheet which has, on the bottom side, naps in island and integrally designed fashions which consist of a plurality of individual fibers. On its top side, the floor covering preferably has a structure. The structures of both sides are formed by needling. When the floor covering is laid, the naps are supported by the substrate floor. This creates a channel system on the bottom side of the floor covering which favors the draining of water. A thus designed floor covering is preferably employed in the outdoor field, for example, as a tennis court covering, wherein granules can be introduced into the recesses on the top side.

DE 44 44 030 describes a floor covering, especially for tennis courts. It consists of a carpet-type base covering and an anti-slip scattering applied thereto which consists of individual loose particles. The particles of the anti-slip scattering are respectively extruded from plastic with a substantially defined cross-sectional shape and length, the respective length being at least approximately equal to the particle width or height running about midway through the cross-section.

DE 198 12 925 A1 describes three-dimensional, dimensionally stable formed parts based on structured needle-punched webs. The needle-punched webs of thermoplastic fibers having a first layer of a mixture of polypropylene (PP) fibers and polyethylene (PE) fibers and a second and optionally further layers of a mixture of PP fibers and PE fibers is prepared from bicomponent fibers consisting of a mixture of PP and PE or from a mixture of such bicomponent fibers with PP fibers and/or PE fibers, wherein the two layers are bonded within and between them both by needle punching and by molten or surface-molten fibers or fiber parts of the PE fraction of the two layers.

DE 44 28 613 A1 describes a sound-absorbing and heat-insulating material. It describes, in particular, to combine the characteristics of highly condensed materials with those of flexible sound-absorbing bulky materials with good flow characteristics by the combination of several materials and layer thicknesses with a distance-fixed structure, in order to manage both tasks as much as possible. This was achieved by the use of predominantly recycled fibrous materials which, due to their wide variety of geometries, irregularly form artificial reflecting and absorbing barriers within the layers, and with fillers in the fiber layers, as well as by a multilayer structure making use of all technical possibilities of non-woven and fiber-laying technology, as well as in combination with non-textile materials.

DE 44 22 585 C1 describes an air-noise absorbing formed part and a method for its preparation. In particular, it describes an air-noise absorbing formed part consisting of first and second semifinished products each consisting of at least one layer of non-woven material, wherein said semifinished products are arranged adjacent to each other at a distance in the direction of the incoming air noise to form at least one hollow space, wherein said semifinished products are functionally arranged in series and supported on each other, and wherein the second semifinished product, which faces away from the air noise, has a higher acoustic impedance as compared to the first semifinished product, which faces towards the air noise. The acoustic impedance of the second semifinished product is 1.25 to 5 times as high as the acoustic impedance of the first semifinished product, and the first semifinished product has an acoustic impedance of 40 to 80 Rayl, and the second semifinished product has an acoustic impedance of 90 to 150 Rayl.

A common feature of the above mentioned prior art is a relatively narrow sound-absorption frequency spectrum when the sound absorber consists of several interconnected non-woven sheets. Alternatively, sound absorbers are known which have a heavy layer and thus act according to the spring/mass principle. However, such sound absorbers are relatively heavy, and the heavy layer, which is mostly made of ethylene/vinyl acetate copolymers having a high content of fillers, is little suitable for recycling. Although the sound absorption is satisfactory within a range of from 100 to 500 Hz, it is absolutely unsatisfactory in a higher frequency range.

In contrast, the object of the present invention is to improve sound absorption especially in the particularly interesting frequency range of from 200 to 800 Hz.

DESCRIPTION

Figure 1:
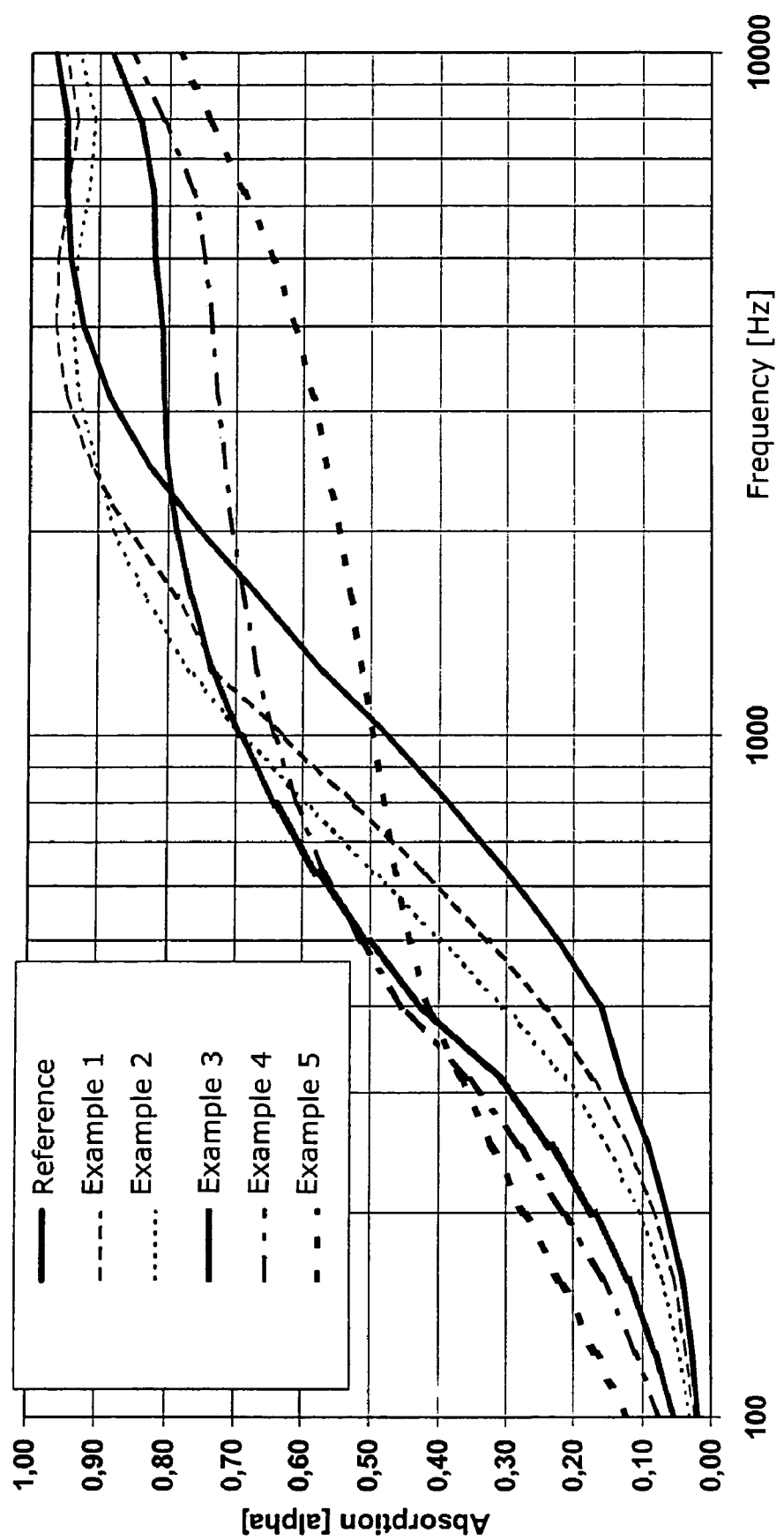
FIG. 1 shows the sound absorption as a function of the frequency of the individual Examples.

The above object is achieved by a sound absorber consisting of two interconnected non-woven fabrics (1,2) bonded through thermoplastic and/or thermoset materials, wherein the non-woven fabric (1) facing towards the sound-emitting source has a layer thickness within a range of from 2 to 15 mm, a density within a range of from 50 to 500 $kg/m^3$, a weight per surface area within a range of from 0.1 to 2.5 $kg/m^2$, and a flow resistance within a range of from 50 to 1000 $kNs/m^4$, and the non-woven fabric (2) facing away from the sound-emitting source has a layer thickness within a range of from 10 to 28 mm, a density within a range of from 20 to 100 $kg/m^3$, a weight per surface area within a range of from 0.4 to 1 $kg/m^2$, and a flow resistance within a range of from 10 to 40 $kNs/m^4$, with a total thickness of the sound absorber within a range of from 12 to 30 mm and a total weight per surface area of the sound absorber within a range of from 0.5 to 3 $kg/m^2$.

In the relevant frequency range of from 200 to 800 Hz, the overall energy reduction of the sound absorbers according to the invention is at least equal to that of a spring/mass system or even improved thereover. This spring/mass system, which is usually employed in the motor vehicles field, has a high sound absorption capacity; however, this is not necessarily required in the motor vehicles field, because the sound can also spread further via side paths, such as untreated surfaces, for example, glass.

The sound absorbers according to the invention have an optimum absorption in the low and middle frequency ranges in order to give a good acoustic performance. According to the invention, this is achieved, in particular, by the combination of a high-density non-woven fabric 1 facing towards the sound-emitting source and a low-density non-woven fabric 2 facing away from the sound-emitting source. Preferably, the non-woven fabric 2 is directly adjacent to the sheet metal of the motor vehicle and thus does not form an air gap between the non-woven fabric and the sheet metal.

In the automobile field, non-woven fabrics are a frequently employed construction material having a broad range of properties. For example, a non-woven fabric containing phenol resin as a binder has long been used as a material for supporting and lined parts (as such or as a composite material) in the automobile industry in passenger car and truck construction due to its good damping properties.

Non-woven fabric containing phenol resin as a binder is commercially available in gross densities of from 50 to 1000 $kg/m^3$ at thicknesses of from 5 to 30 mm. It can be described as a so-called pore composite which consists of three phases (cotton, cured phenol resin and air), being a construction material whose property profile can be modified within broad limits. Cotton is present as fibers while the phenol resin has a punctual, linear or also two-dimensionally net-like form and serves as a kind of matrix.

By a special selection of the non-woven materials, the acoustic properties and the strength of the composite material can be controlled, in particular. Particularly preferred materials for preparing the non-woven material are fiber-glass reinforced or fiber-glass mesh reinforced fibrous materials, namely non-woven fabrics containing binders, preferably those consisting of a mixed cotton fabric. These non-woven sheets are brought to the desired strength by compressing at elevated temperature.

The particular properties and performance of this latter group of products are accounted for by the chemical and morphological structure of cotton and the thermoset character of the cured phenol resins, which are usually employed as binders of the mixed cotton non-woven fabrics. Further influencing quantities are the formability and ironing capability of cotton, the statistic bonding site frequency and also the laminate and/or coat effect of the binder molecules adhering along the length of fibers and thus being also condensed out.

Cotton survives the production process virtually without a change of its physicochemical property characteristics. It confers particular quality features to the product, such as sound absorption property, good mechanical strength values, impact strength and cold shatter-proof property.

Particularly preferred binders for the non-woven materials are selected from phenol-formaldehyde resins, epoxy resins, polyester resins, polyamide resins, polypropylene, polyethylene and/or ethyl/vinyl acetate copolymers. After curing, phenol resins have the typical properties of thermoset materials which are manifested in the final product. The non-woven fabric is usually prepared in a dry fashion from reprocessed cotton and the powdery phenol resin. The curing is effected either in a heating flue or via the uncured semifinished product as an intermediate step in a press. For the parts which are to be used in the vehicle space, selected textiles are employed.

In a particular embodiment of the present invention, the base material of the non-wovens comprises polypropylene (PP), polyethylene (PE), polyethylene terephthalate (PET) and/or polyamide (PA), essentially in a fibrous form. Alternatively, it is of course also possible to employ natural fibers in place of or in addition to synthetic fibers. Among the various useful natural fibers are seed fibers such as cotton; fruit wall fibers such as kapok, bast fibers such as linen, flax, hemp and jute; and hard fibers such as sisal and cocoa.

Non-woven fabrics according to the present invention preferably contain a combination of natural fibers, especially cotton, flax, jute, linen, and synthetic fibers, such as polybutylene terephthalates, polyethylene terephthalates, nylon 6, nylon 66, nylon 12, viscose or rayon, as the textile fibers, optionally in addition to usual binders.

The kind and quantity of the binders to be employed is essentially determined by the intended use of the non-woven fabrics. Thus, it is generally preferred to use from 5 to 50% by weight, especially from 20 to 40% by weight, of the binder, based on the non-woven fabric 1 and/or the non-woven fabric 2.

Optionally, the non-woven fabrics 1 and/or 2 may have a raster profile, especially at the interface between the two layers. The profile is preferably produced from one side; it may consist, for example, of convex protrusions on one side which are represented as cones or pyramids. By a material- and cost-saving "nap cutting technique", excellent acoustic values can be achieved by a hollow chamber principle.

Particularly preferred according to the present invention are sound absorbers which are characterized in that the non-woven fabric 1, which faces towards the sound-emitting source, has a layer thickness within a range of from 3 to 7 mm, a density within a range of from 50 to 300 kg/m$^3$, a weight per surface area within a range of from 0.25 to 1.5 kg/m$^2$, and a flow resistance within a range of from 70 to 500 kNs/m$^4$.

Similarly, sound absorbers according to the present invention are particularly preferred if the non-woven fabric 2, which faces away from the sound-emitting source, has a layer thickness within a range of from 12 to 18 mm, a density within a range of from 30 to 70 kg/m$^3$, a weight per surface area within a range of from 0.6 to 0.8 kg/m$^2$, and a flow resistance within a range of from 15 to 30 kNs/m$^4$.

Especially in the automobile field, the use of sound absorbers which are as light-weight and as thin as possible is particularly preferred. Accordingly, sound absorbers according to the present invention are particularly preferred if the total thickness of the sound absorber is within a range of from 15 to 25 mm, and the total weight per surface area of the sound absorber is within a range of from 1 to 2.5 kg/m$^2$.

The ratio of the layer thicknesses of the non-woven fabric 1 to the non-woven fabric 2 substantially affects the sound absorption qualities.

In the case where the ratio of the layer thicknesses of the non-woven fabric 1 to the non-woven fabric 2 is within a range of from 2:1 to 5:1, especially from 3:1 to 4:1, an optimized performance with an excellent sound absorption is found not only within a range of from 200 to 800 Hz, but also in a higher frequency region of from 1000 to 10,000 Hz.

According to the present invention, a similar optimization was found if the ratio of the densities of the non-woven fabric 1 to the non-woven fabric 2 is within a range of from 3:1 to 6:1, especially from 4:1 to 5:1.

The sound absorbers according to the invention are prepared as usual by a thermoforming process so that tools and production means per se known in the prior art can be further employed for a given material conversion. In particular, according to the present invention, the sound absorbers are prepared by compressing and bonding said non-woven fabrics 1,2 bonded through thermoplastic and/or thermoset materials under the action of the binder.

Particularly preferred according to the present invention is a method for the preparation of sound absorbers as defined above, comprising:

a) pasting a first base material consisting of a textile fiber material and a thermoplastic and/or thermosetting binder into a mold, optionally partially, to form the non-woven fabric 1;

b) predensifying the base material pasted according to step a) by heating and/or pressure;

c) pasting a second base material consisting of a textile fiber material and a thermoplastic and/or thermosetting binder, optionally partially, onto the first base material in the mold to form the non-woven fabric 2;

d) densifying the undensified sound absorber by the action of heat and pressure; and e) cooling down to room temperature.

As an alternative to the above mentioned method, it is similarly possible to prepare the sound absorbers according to the invention by:

a) pasting a first base material consisting of a textile fiber material and a thermoplastic and/or thermosetting binder into a mold, optionally partially, to form the non-woven fabric 1;

b) predensifying the undensified non-woven fabric 1 by the action of heat and pressure;

c) pasting a second base material consisting of a textile fiber material and a thermoplastic and/or thermosetting binder into a mold, optionally partially, to form the non-woven fabric 2;

d) predensifying the undensified non-woven fabric 2 by the action of heat and pressure;

e) superimposing the non-woven fabrics 1,2 and bonding and densifying them by the action of heat and pressure without an adhesive.

Another alternative to the above mentioned preparation method for the sound absorbers according to the invention consists of:

a) pasting a first base material consisting of a textile fiber material and a thermoplastic and/or thermosetting binder into a mold, optionally partially, to form the non-woven fabric 1;

b) predensifying the undensified non-woven fabric 1 by the action of heat and pressure;

c) pasting a second base material consisting of a textile fiber material and a thermoplastic and/or thermosetting binder into a mold, optionally partially, to form the non-woven fabric 2;

d) predensifying the non-woven fabric 2 by the action of heat and pressure;

e) superimposing the non-woven fabrics 1,2 and bonding non-woven fabric 2 to non-woven fabric 1 by needle punching.

Another variant of the preparation of the sound absorbers according to the invention consists of, for example:

a) pasting a first base material consisting of a textile fiber material and a thermoplastic and/or thermosetting binder into a mold, optionally partially, to form the non-woven fabric 1;

b) predensifying the undensified non-woven fabric 1 by the action of heat and pressure;

c) pasting a second base material consisting of a textile fiber material and a thermoplastic and/or thermosetting binder into a mold, optionally partially, to form the non-woven fabric 2;

d) predensifying the non-woven fabric 2 by the action of heat and pressure;

e) superimposing the non-woven fabrics 1,2 and bonding them together by needle punching using different needles.

The sound absorbers according to the invention can be employed, for example, in means of traffic, especially motor vehicles, airplanes, ships and railway wagons, as well as in real estates in the indoor and outdoor regions, especially as a lower covering of floor coverings, but also, for example, as a lower covering of sports areas, such as tennis courts.

It is particularly preferred according to the present invention to employ the sound absorbers according to the present invention as hood insulations, exterior bulkhead insulations, interior bulkhead insulations, textile wheel arch shells and lower shield in the engine compartment; as front floor insulations, middle floor insulations, floor coverings, roof liners, top bulkhead insulation, side trim and seat well insulations in the passenger compartment, or as textile wheel arch shells, trunk floor linings, rear shelves, trunk cover linings and trunk side linings in the trunk.

EXAMPLES

The following Table states the data of Examples 1 to 5 according to the invention and a Reference Example. The FIGURE shows the sound absorption as a function of the frequency of the individual Examples. The flow resistance of the Examples was determined according to DIN.

TABLE

| Reference Example | | Layer thickness [mm] | Density [kg/m$^3$] | Weight per surface area [kg/m$^2$] | Flow resistance [kNs/m$^4$] |
| --- | --- | --- | --- | --- | --- |
| Side facing towards the sound | non-woven 1 | 5 | 50 | 0.25 | 20 |
| Side facing away from the sound | non-woven 2 | <u>15</u> | 50 | <u>0.75</u> | 20 |
| | total: | 20 | | 1 | |
| Example 1 | | | | | |
| Side facing towards the sound | non-woven 1 | 5 | 100 | 0.5 | 74 |
| Side facing away from the sound | non-woven 2 | <u>15</u> | 50 | <u>0.75</u> | 20 |
| | total: | 20 | | 1.25 | |
| Example 2 | | | | | |
| Side facing towards the sound | non-woven 1 | 5 | 150 | 0.75 | 120 |
| Side facing away from the sound | non-woven 2 | <u>15</u> | 50 | <u>0.75</u> | 20 |
| | total: | 20 | | 1.5 | |
| Example 3 | | | | | |
| Side facing towards the sound | non-woven 1 | 5 | 200 | 1 | 250 |
| Side facing away from the sound | non-woven 2 | <u>15</u> | 50 | <u>0.75</u> | 20 |
| | total: | 20 | | 1.75 | |
| Example 4 | | | | | |
| Side facing towards the sound | non-woven 1 | 5 | 250 | 1.25 | 350 |
| Side facing away from the sound | non-woven 2 | <u>15</u> | 50 | <u>0.75</u> | 20 |
| | total: | 20 | | 2 | |
| Example 5 | | | | | |
| Side facing towards the sound | non-woven 1 | 5 | 300 | 1.5 | 500 |
| Side facing away from the sound | non-woven 2 | 15 | 50 | 0.75 | 20 |

TABLE-continued

| Reference Example | Layer thickness [mm] | Density [kg/m³] | Weight per surface area [kg/m²] | Flow resistance [kNs/m⁴] |
|---|---|---|---|---|
| total: | 20 | | 2.25 | |

The invention claimed is:

1. A sound absorber consisting of two interconnected non-woven fabrics bonded through at least one of a thermoplastic and a thermoset materials, wherein the first non-woven fabric facing towards the sound-emitting source has a layer thickness within a range of from 2 to 15 mm, a density within a range of from 50 to 500 kg/m³, a weight per surface area within a range of from 0.1 to 2.5 kg/m², and a flow resistance within a range of from 50 to 1000 kNs/m⁴, and the second non-woven fabric facing away from the soundemitting source has a layer thickness within a range of from 10 to 28 mm, a density within a range of from 20 to 100 kg/m³, a weight per surface area within a range of from 0.4 to 1 kg/m², and a flow resistance within a range of from 10 to 40 kNs/m⁴, with a total thickness of the sound absorber within a range of from 12 to 30 mm and a total weight per surface area of the sound absorber within a range of from 0.5 to 3 kg/m².

2. The sound absorber according to claim 1, wherein said at least one of a first non-woven fabric and a said second non-woven fabric consist of natural fibers synthetic fibers or combination thereof.

3. The sound absorber according to claim 1, wherein at least one said first non-woven fabric and said second non-woven fabric contain natural fibers selected from seed fibers, fruit wall fibers, bast fibers, and hard fibers including mixtures thereof.

4. The sound absorber according to claim 1, wherein at least one of said first non-woven fabric and said second non-woven fabric contain synthetic fibers selected from polyolefins, polyesters, and polyamides as well as viscose and rayon including their mixtures.

5. The sound absorber according to claim 1, wherein said thermoplastic binder is selected from polyolefins and, ethyl/vinyl acetate copolymers.

6. The sound absorber according to claim 1, wherein said thermoset binder is selected from phenol-formaldehyde resins, epoxy resins and/or polyamide resins and combination thereof.

7. The sound absorber according to claim 1, wherein the amount of at least one of said thermoplastic and thermoset binder is from 5 to 50% by weight, based on said first non-woven fabric or said second non-woven fabric or both.

8. The sound absorber according to claim 1, wherein the first non-woven fabric facing towards the sound-emitting source has a layer thickness within a range of from 3 to 10 mm, a density within a range of from 50 to 300 kg/m³, a weight per surface area within a range of from 0.2 to 2 kg/m², and a flow resistance within a range of from 70 to 500 kNs/m⁴.

9. The sound absorber according to claim 1, wherein the second non-woven fabric facing away from the sound-emitting source has a layer thickness within a range of from 12 to 18 mm, a density within a range of from 30 to 70 kg/m³, a weight per surface area within a range of from 0.6 to 0.8 kg/m², and a flow resistance within a range of from 15 to 30 kNs/m⁴.

10. The sound absorber according to claim 1, wherein the total thickness of the sound absorber is within a range of from 15 to 25 mm, and the total weight per surface area of the sound absorber is within a range of from 1 to 2.5 kg/m².

11. The sound absorber according to claim 1, wherein the ratio of the layer thicknesses of the second non-woven fabric to the first non-woven fabric is from 2:1 to 5:1.

12. The sound absorber according to claim 1, wherein the ratio of the densities of the first non-woven fabric to the second non-woven fabric is from 3:1 to 6:1.

13. A method for the preparation of sound absorbers comprising the steps of:
 a) pasting a first base material including a textile fiber material and at least one of a thermoplastic and a thermosetting binder into a mold to form a first non-woven fabric;
 b) predensifying the first non-woven fabric pasted according to step a) by at least one of heating and pressure;
 c) pasting a second base material including a textile fiber material and at least one of a thermoplastic and a thermosetting binder onto the first non-woven fabric in the mold to form a second non-woven fabric;
 d) densifying the first and second non-woven materials by the action of heat and pressure to form a sound absorber wherein the first non-woven material has a layer thickness within a range of from 2 to 15 mm, a density within a range of from 50 to 500 kg/m³, a weight per surface area within a range of from 0.1 to 2.5 kg/m², and said second non-woven material has a layer thickness within a range of from 10 to 28 mm, a density within a range of from 20 to 100 kg/m³, a weight per surface area within a range of from 0.4 to 1 kg/m², and a flow resistance within a range of from 10 to 40 kNs/m⁴; and
 e) cooling the sound absorber down to room temperature wherein the sound absorber has a total thickness of the sound absorber within a range of from 12 to 30 mm and a total weight per surface area of the sound absorber within a range of from 0.5 to 3 kg/m².

14. A method for the preparation of sound absorbers comprising the steps of:
 a) pasting a first base material including a textile fiber material and at least one of a thermoplastic and a thermosetting binder into a mold, to form a first non-woven fabric;
 b) predensifying the undensified first non-woven fabric by the action of heat and pressure;
 c) pasting a second base material consisting of a textile fiber material and at least one of a thermoplastic and a thermosetting binder into a mold, optionally partially, to form the second non-woven fabric;
 d) predensifying the undensified second non-woven fabric by the action of heat and pressure; and
 e) superimposing the first and second non-woven fabrics and bonding and densifying them by the action of heat and pressure without an adhesive to form a sound absorber wherein the first non-woven material has a layer thickness within a range of from 2 to 15 mm, a density within a range of from 50 to 500 kg/m$^3$, a weight per surface area within a range of from 0.1 to 2.5 kg/m$^2$, and said second non-woven material has a layer thickness within a range of from 10 to 28 mm, a density within a range of from 20 to 100 kg/m$^3$, a weight per surface area within a range of from 0.4 to 1 kg/m$^2$, and a flow resistance within a range of from 10 to 40 kNs/m$^4$.

15. A method for the preparation of sound absorbers comprising the steps of:
- a) pasting a first base material consisting of a textile fiber material and at least one of a thermoplastic and a thermosetting binder into a mold, optionally partially, to form a first non-woven fabric;
- b) predensifying the undensified first non-woven fabric by the action of heat and pressure;
- c) pasting a second base material consisting of a textile fiber material and at least one of a thermoplastic and a thermosetting binder into a mold, optionally partially, to form the second non-woven fabric;
- d) predensifying the second non-woven fabric by the action of heat and pressure; and
- e) superimposing the first and second non-woven fabrics and bonding said second non-woven fabric to said first non-woven fabric by needle punching to form a sound absorber wherein the first non-woven material has a layer thickness within a range of from 2 to 15 mm, a density within a range of from 50 to 500 kg/m$^3$, a weight per surface area within a range of from 0.1 to 2.5 kg/m$^2$, and said second non-woven material has a layer thickness within a range of from 10 to 28 mm, a density within a range of from 20 to 100 kg/m$^3$, a weight per surface area within a range of from 0.4 to 1 kg/m$^2$, and a flow resistance within a range of from 10 to 40 kNs/m$^4$.

16. Use of a sound absorber according to claim 1 as hood insulations, exterior bulkhead insulations, interior bulkhead insulations, textile wheel arch shells and lower shield in the engine compartment; as front floor insulations, middle floor insulations, floor coverings, roof liners, top bulkhead insulation, side trim and seat well insulations in the passenger compartment, or as textile wheel arch shells, trunk floor linings, rear shelves, trunk cover linings and trunk side linings in the trunk.

17. The sound absorber according to claim 1 wherein the ratio of the layer thicknesses of the first non-woven fabric to the second non-woven fabric is from 3:1 to 4:1.

18. The sound absorber according to claim 1, wherein the ratio of densities of the first non-woven fabric to the second non-woven fabric is from 4:1 to 5:1.

* * * * *